United States Patent
Wypyszynski et al.

(10) Patent No.: US 10,689,109 B2
(45) Date of Patent: Jun. 23, 2020

(54) INTERCEPTOR UNMANNED AERIAL SYSTEM

(71) Applicant: Dynetics, Inc., Huntsville, AL (US)

(72) Inventors: Aaron Wypyszynski, Meridianville, AL (US); Bill Martin, Madison, AL (US); John Roy, Madison, AL (US); Stephen R. Norris, Madison, AL (US)

( * ) Notice: Subject to any disclaimer, the term of this patent is extended or adjusted under 35 U.S.C. 154(b) by 342 days.

(21) Appl. No.: 15/656,295

(22) Filed: Jul. 21, 2017

(65) Prior Publication Data
US 2018/0105271 A1    Apr. 19, 2018

Related U.S. Application Data

(60) Provisional application No. 62/407,641, filed on Oct. 13, 2016.

(51) Int. Cl.
*B64C 39/02*    (2006.01)
*F41H 11/04*    (2006.01)

(52) U.S. Cl.
CPC ............ *B64C 39/024* (2013.01); *F41H 11/04* (2013.01); *B64C 2201/027* (2013.01); *B64C 2201/108* (2013.01); *B64C 2201/12* (2013.01); *B64C 2201/141* (2013.01); *B64C 2201/165* (2013.01)

(58) Field of Classification Search
CPC ........ B64D 1/00; B64D 17/80; B64C 39/024; B64C 2201/108; B64C 2201/12; B64C 2201/141; B64C 2201/165; B64C 9/32; B64C 2201/107; B64C 2201/185; F41H 11/04; F41H 13/00; F41H 13/0006

USPC ....................................................... 244/17.23
See application file for complete search history.

(56) References Cited

U.S. PATENT DOCUMENTS

| | | | | |
|---|---|---|---|---|
| 2,378,563 A | * | 6/1945 | Lakatos, Jr. ............ | F41H 11/04 89/36.16 |
| 7,201,348 B1 | * | 4/2007 | Flammer ................. | F41H 11/02 244/110 C |
| 8,788,118 B2 | | 7/2014 | Matos | |
| 9,085,362 B1 | * | 7/2015 | Kilian ..................... | B64C 25/68 |
| 9,175,934 B1 | | 11/2015 | Killian | |
| 9,862,489 B1 | * | 1/2018 | Weinstein ............. | B64C 39/024 |
| 2004/0050014 A1 | * | 3/2004 | Lisa ......................... | E04H 9/04 52/741.3 |

(Continued)

OTHER PUBLICATIONS

William Cory Spence, How Drone Disabling Patents Change Everything, IPWatchdog.com, Apr. 6, 2016, http://www.ipwatchdog.com/2016/04/06/drone-disabling-patents/id=67593/—printed Nov. 7, 2016.

(Continued)

*Primary Examiner* — Richard R. Green
*Assistant Examiner* — Brady W Frazier
(74) *Attorney, Agent, or Firm* — Stephen H. Hall; Ryan J. Letson; Bradley Arant Boult Cummings LLP

(57) ABSTRACT

The present disclosure primarily relates to interceptor unmanned aerial systems and methods for countering Unmanned Aerial Systems (UAS), although the inventions disclosed herein are useful for capture of any aerial object. The system utilizes a rigid effector frame, an effector attached directly to the frame, and at least two propulsion elements connected to the effector frame, and is configured to intercept and disable threat UAS. The disclosed systems can be oriented to any virtually any angle to maximize the chances of intercept.

12 Claims, 12 Drawing Sheets

(56) References Cited

U.S. PATENT DOCUMENTS

| | | | | |
|---|---|---|---|---|
| 2004/0262893 | A1* | 12/2004 | Kempf | B60R 21/34 |
| | | | | 280/730.1 |
| 2010/0181424 | A1* | 7/2010 | Goossen | F41H 13/0006 |
| | | | | 244/110 F |
| 2012/0187243 | A1* | 7/2012 | Goldie | B64C 39/024 |
| | | | | 244/110 C |
| 2012/0211595 | A1* | 8/2012 | Johnson | F41H 11/02 |
| | | | | 244/3.22 |
| 2015/0076285 | A1* | 3/2015 | Chavez, Jr. | B64C 39/024 |
| | | | | 244/116 |
| 2016/0251088 | A1* | 9/2016 | Melish | B64F 1/02 |
| | | | | 244/110 C |
| 2017/0253325 | A1* | 9/2017 | Zou | B64C 27/006 |

OTHER PUBLICATIONS

Kelsey Campbell-Dollaghan, Sky Fighter: Meet the Man Who Wants to Drone-Proof Your Home, Gizmodo.com, Jun. 28, 2013, http://gizmodo.com/sky-fighter-meet-the-man-who-wants-to-drone-proof-your-600375084—printed Nov. 7, 2016.

Nancy Owano, Boeing's weapon against drones: Thank laser, think welding torch, TechXplore, Aug. 30, 2015, https://techxplore.com/news/2015-08-boeing-weapon-drones-laser-welding.html—printed Nov. 7, 2016.

David Szondy, Anti-UAV Defense System uses radio beam to disable drones, Newatlas.com, Oct. 11, 2015, http://newatlas.com/anti-uav-defense-system-radio-beam-drones/39778/—printed Nov. 8, 2016.

* cited by examiner

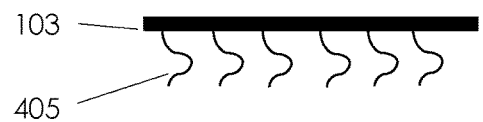
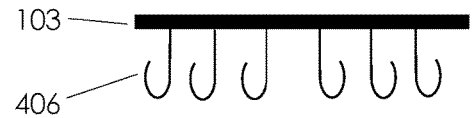
Fig. 4(e)                    Fig. 4(f)
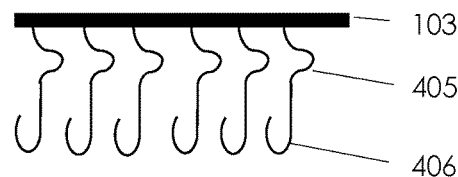
Fig. 4(g)
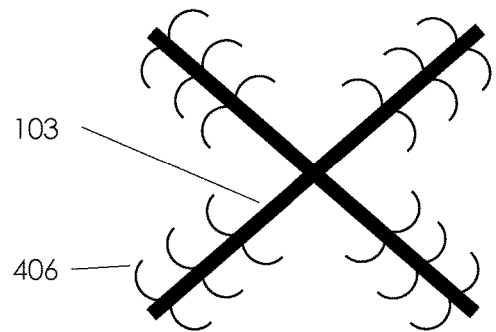
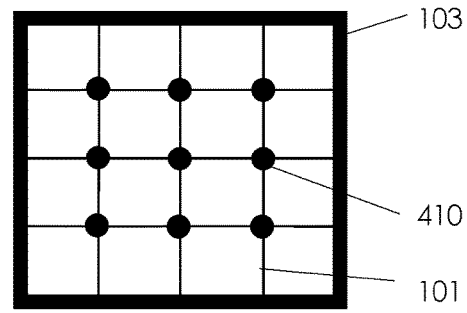
Fig. 4(h)                    Fig. 4(i)

INTERCEPTOR UNMANNED AERIAL SYSTEM

CROSS-REFERENCE TO RELATED APPLICATIONS

This application claims priority to, and the benefit of, U.S. Application Ser. No. 62/407,641 titled "Interceptor Unmanned Aerial System," filed Oct. 13, 2016, the entire contents of which are herein incorporated by reference.

FIELD OF THE INVENTION

The present disclosure and invention generally relates to countering the emerging threat of unmanned aerial vehicles (UAVs), also known as Unmanned Aerial Systems (UAS). The present disclosure allows for disabling and capturing threat UAVs using an Interceptor UAS. Various embodiments are disclosed, including Interceptor UAS that provide an autonomously guided fixed effector which is capable of intercepting, engaging, re-engaging, disabling, and capturing a threat UAV. The disclosed invention may also be used for capture of any aerial object and is not solely limited to capturing UAVs. Additional objects may include, but are not limited to, items such as birds, flying wildlife, and air dropped or ground launched packages. For example, packages to be delivered by a UAS could be launched into the air, and the present invention could be used to capture the package midair and then delivered.

BACKGROUND

The rapid growth of small Unmanned Aerial Systems (sUAS) has created a rapidly accelerating threat to both commercial and military interests. Increased capabilities in low cost, commercial autopilots have also greatly increased the capabilities of sUAS. Today's sUAS are not only capable of carrying cameras for fun and pictures, but also are able to carry nefarious payloads such as explosives and/or other dangerous materials. They can operate autonomously with little or no input from an operator, even while performing long distance, one-way missions. The threat of sUAS is further intensified by their ability to operate in dense urban environments and over sensitive areas such as large open air gatherings of people in locations such as concerts and sports venues.

Many current counter sUAS systems rely on either jamming or disabling the target vehicle. Jamming techniques are already becoming ineffective as many of today's autopilots are capable of fully autonomous flight with no Radio Frequency (RF) input. Some can function without navigation provided by Global Positioning Systems (GPS). By operating without dependence on RF signals, modern sUAS can counter many current jamming systems.

Some capabilities already exist to disable sUAS vehicle by means of kinetic systems such as projectiles, lasers, and nets. These systems are effective against RF-independent sUAS. However, these kinetic defense systems pose an additional threat to people and/or property in the area of the intercept. For example, projectiles and lasers can injure innocent bystanders. Net systems help to reduce the risk of collateral damage, but the sUAS still impacts in the vicinity of bystanders who could be exposed to a harmful payload carried by the sUAS.

Additional systems have been proposed using deployable nets mounted on inflatable frames and carried on UAS. These systems require deployment mechanisms for the net systems in order to allow normal operation of the UAS (including landing and take off) when the net system is not deployed. Also, when used on any fixed wing aircraft or UAS, such deployable nets are necessarily dragged along the trajectory of the aircraft or UAS, and not particularly maneuverable.

Thus, an improved interceptor system for countering UASs is needed.

SUMMARY

In view of the foregoing disadvantages inherent in the conventional counter UAS systems now present in the art, the present disclosure provides an interceptor system for countering UAS systems. The present disclosure also provides a system that can be used for capture of other aerial objects.

Unlike many of the prior art systems which propose use of a deployable net or capture system from a traditional aircraft or UAS system, some embodiments of the present invention take the fundamentally different approach by effectively using a flying "net". In other words, in some embodiments, the invention uses a pre-deployed, fixed entrapment effector, and essentially attaches propulsion elements to the effector, and integrates command and control for intercept. This approach can eliminate the need for some deployment mechanisms of a net from a fixed wing aircraft or UAS.

Many of the disclosed embodiments also provide advantages over the prior art through the use of multiple propulsion elements, which can be used to orient the effector any virtually any angle to maximize the chances of intercept, and which can be achieved independently of the direction of movement of the effector and angle of the propulsion elements.

In some embodiments, the interceptor unmanned aerial system comprises a rigid, fixed effector frame forming an outer perimeter of the interceptor unmanned aerial system, an effector attached directly to the frame, and at least two propulsion elements connected to the effector frame and positioned at or proximate to said outer perimeter. Other numbers of propulsion elements can be used, including 4, 6, 8, etc., just as examples. The propulsion elements may be located inside the frame perimeter, or outside the frame perimeter. In some embodiments, the propulsion elements are rotatable relative to the effector frame. The system may also utilize energy storage devices positioned on the effector frame.

In some embodiments, the effector frame is rectangular in shape, having a first end frame arm, second end frame arm, first side frame al in, and second side frame arm, forming four corners, and having a propulsion element in each of the four corners. In other embodiments, the propulsion elements may be positioned at just two opposing corners, or at two places along the length of opposing frame arms. Some embodiments also including landing legs (or landing gear). In some embodiments, there are two landing legs each connected to the frame at a corner and connected to the frame along the side fame arms.

In some embodiments, the effector is releasable from the effector frame. Additionally, some embodiments may utilize tethers connected to the effector frame and the effector, wherein said tethers are configured to carry an entangled UAS as a slung load beneath the interceptor unmanned aerial system. Some embodiments may also use a parachute connected to the effector and configured to deploy when the effector is released from the effector frame. Some embodiments may also have use replacement effectors positioned in a replacement effector storage compartment connected to the effector frame, wherein said replacement effector is configured to deploy upon release of the effector.

Some embodiments of the interceptor unmanned aerial system can position the effector frame between 45 and 60 degrees relative to horizontal when said propulsion elements are positioned vertically. Some embodiments may also have one or more object sensing devices.

In some embodiments, the interceptor unmanned aerial system comprises a rigid, fixed effector frame forming an outer perimeter of the interceptor unmanned aerial system, wherein the effector frame is rectangular in shape, said effector frame having a first end frame arm, second end frame arm, first side frame arm, and second side frame arm, said effector frame having four corners, an effector attached directly to the frame; and at least two propulsion elements rotatable relative to the effector frame and connected to the effector frame and positioned at or proximate to said outer perimeter.

In some embodiments, the interceptor unmanned aerial system comprises a rigid effector frame forming an outer perimeter of the interceptor unmanned aerial system, an effector attached directly to the frame; and at least four propulsion elements rotatable relative to the effector frame and connected to the effector frame and positioned at or proximate to said outer perimeter. In some embodiments that frame is collapsible between a deployed state and a stored state.

BRIEF DESCRIPTION OF THE DRAWINGS

It should be noted that identical features in different drawings are generally shown with the same reference numeral. Various other objects, features and attendant advantages of the present invention will become fully appreciated as the same becomes better understood when considered in conjunction with the accompanying drawings.

FIG. 4(e) is a side view of one embodiment of an effector frame and loose material.

FIG. 4(f) is a side view of one embodiment of an effector frame and hooks.

FIG. 4(g) is a side view of one embodiment of an effector frame and loose materials and hooks.

FIG. 4(h) is a top view of one embodiment of an effector frame and hooks.

FIG. 4(i) is a top view of one embodiment of an effector frame and effector.

DETAILED DESCRIPTION

Figure 1A:
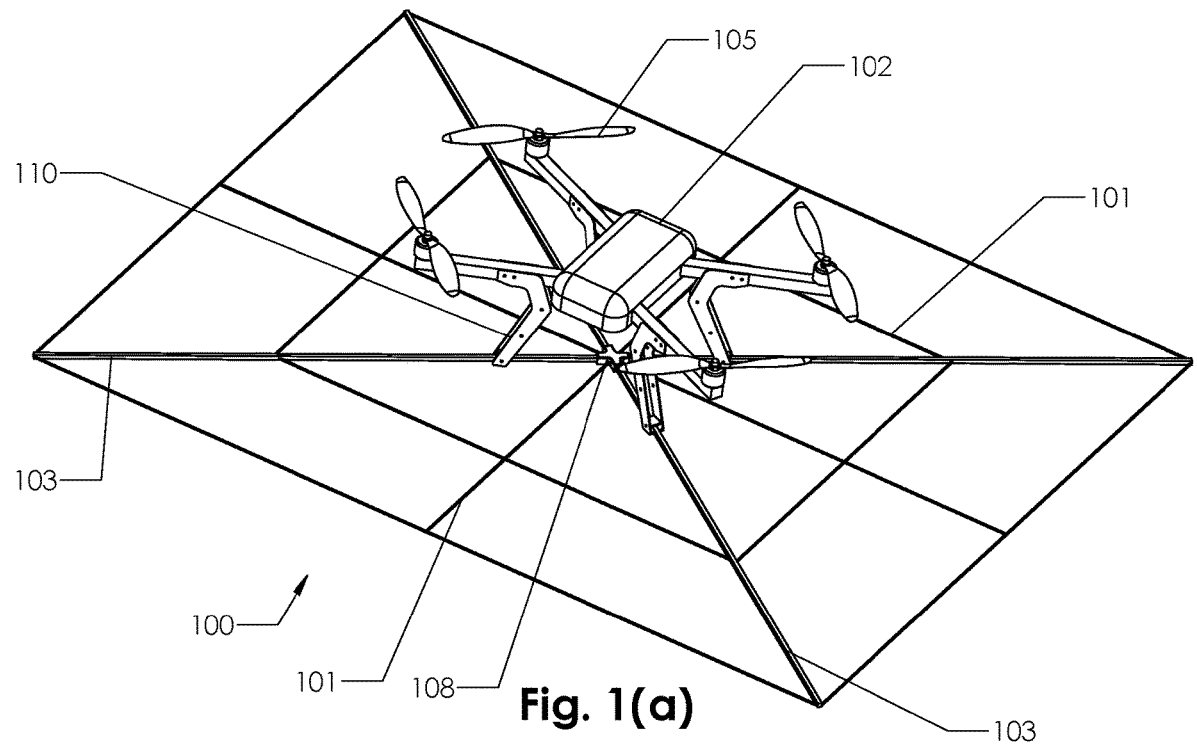
FIG. 1(a) shows one embodiment using an effector fixed to an UAS airframe.

FIGS. 1 through 11(b) illustrate various views and embodiments of the present invention, and supporting graphs and data. Various embodiments may have one or more of the components outlined below. Component reference numbers used in the figures are also provided.

Interceptor 100
Effector 101
UAS 102
Effector frame 103
Propellers 105
Frame center support 108
Support Arms 110
Propulsion element 202
Energy storage device 203
Landing legs 204
First end frame arm 205
Second end frame arm 206
First side frame arm 207
Second side frame arm 208
Frame corner 210
Angle 220
Propulsion element supports 305
Frame arms 401
Distal end of arms 402
Loose material 405
Hooks 406
Attachment points 410
Tethers 502
Parachute 602
Motor location 701
Frame mid span 702
Pivot point 703
Deployment container 704
Radar 801
LIDAR sensor 802
Onboard guidance pods 805
Outer warning zone 901
Inner defended zone 902
Target 903
Escort position 906
Capture position 909
Recovery location 910
Intercept processor 950
Ground based sensor(s) 955
Onboard sensor 960
Tracks 1101
Replacement effector storage compartment 1103
Engagement Area 1104

Many of today's counter UAS technologies involve interruption of aircraft command and control, jamming of navigation signals, or the use of kinetic weapons to destroy the UAS. Increasingly, threat UAS are being operated in areas where collateral damage due to disabling a threat UAS is not an option. Additionally, UAS are becoming more advanced such that certain vulnerabilities are now being eliminated or hardened, thus rendering some existing defeat mechanisms obsolete. Threat UAS are also increasingly being equipped with nefarious devices that cannot be allowed to fall into the surrounding area. For example, explosives or other nefarious payloads could cause damages to persons and property.

Current methods of disabling UAS include the use of deploying, shooting, or dragging an effector (often in the form of a net) from a separate UAS. However, when using a deploying effector, the orientation and timing for deployment of the effector must be highly accurate. When dragging an effector, the maneuverability of the interceptor is dramatically reduced as flight path must be limited to ensure the effector does not disable the interceptor by accident.

As a result of the limitations that exist in the prior art, improved counter systems are needed by which threat UAS can be effectively intercepted, disabled, captured, and preferably, returned to a safe location.

FIG. 1 shows one embodiment of such an improved counter UAS system, herein referred to as the interceptor 100. In this embodiment, the interceptor 100 comprises a fixed effector 101 and an effector frame 103, rigidly attached to a multirotor UAS 102. The effector frame 103 may use a frame center support 108 to provide additional support and/or interface for the various frame members. The effector frame 103 is preferably rigid, and may be made of graphite, aluminum, composite, or other suitable lightweight material. This effector 101 is designed to disable, entrap (or capture), and retrieve the threat UAS. The interceptor 100 flies near the threat UAS, hereby referred to as the threat UAS, and uses the effector(s) 101 to capture and disable the threat UAS. The effector 101 may be attached to various locations on the effector frame 103 (as shown in FIG. 1(a)), and/or attached to various locations on the UAS 102, or be an integral part of the structure of the UAS 102. The combination of a multi-rotor UAS 102 and a fixed effector 101 allows rapid maneuvering of the interceptor 100, minimizes aerodynamic drag, maintains the maneuverability of the interceptor 100, increases the likelihood of interception, allows rapid change of direction, and facilitates re-engagement of the threat in the event of a missed interception attempt.

In the preferred embodiments, the effector frame 103 and effector 101 are in fixed configuration, e.g., is pre-deployed and ready to use. Such a configuration eliminates the need for separate deployment mechanisms which may lead to increased weight of the interceptor 100, increased costs, increased opportunities for failure, or which may interfere with operation of the interceptor 100.

The general configuration shown utilizes motorized propellers 105 for propulsion of the UAS. However, alternate propulsion methods may be used in place of, or together with, the propellers as dictated by mission needs. These include but are not limited to ducted fans, jet engines, rockets, or other thrust producing devices. Any number of propulsion units (also referred to as propulsion devices or propulsion elements) may be used. In addition, small thrusters may be incorporated into the design, with or without propellers, to aid in maneuverability and increase control effectiveness.

Different configurations of effectors 101 and effector frames 103 can be used in different embodiments. FIG. 1(a), as one exemplary embodiment, depicts the effector 101 attached to the bottom of UAS 102, a typical quadcopter aircraft, a common type of UAS. In this embodiment, an effector frame 103 connects the effector 101 to the UAS 102. As discussed above, the effector frame 103 can be separate from the UAS 102 and connectable to the UAS 102, or the effector frame 103 may be integral to the structure of the UAS 102. Similarly, the effector 101 can be separate from the effector frame 103 and connectable to the effector frame 103, or the effector 101 can be integral to the structure of the effector frame 103. In other embodiments, the UAS 102, effector 101, and effector frame 103 are all integral and configured as a single assembly. The effector 101 is discussed further below.

Figure 1B:
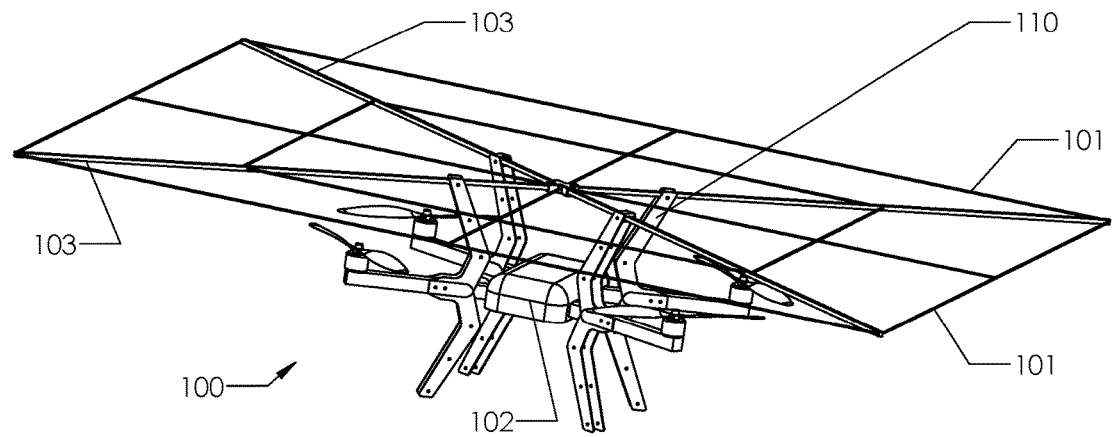
FIG. 1(b) shows another embodiment using an effector fixed to an UAS airframe.

As shown in FIGS. 1(a) and 1(b), in some embodiments support arms 110 can be used to facilitate stability of the effector frame 103 and the connection of the effector frame 103 to the UAS 102. Alternatively, the support arms 110 can also be utilized to secure the effector 101 to the UAS 102, essentially acting as the effector frame 103. As described above, in some embodiments, the support arms 110 can be secured to the UAS 102 and the effector frame 103 secured to the support arms 110. In other embodiments, the support arms 110 are integral to the UAS 102 (for example, also used as landing gear for the UAS 102), and the effector frame 103 simply secured to the support arms 110. Support arms 110 may provide additional spacing such that the effector frame 103 and/or effector 101 are positioned away from the propellers 105 or other propulsion elements. Support am s 110 may be positioned on the top and bottom of the UAS 102 (as shown in FIG. 1(b)), on the bottom of the UAS (as shown in FIG. 1(a)), or to the sides of the UAS 102 (not shown).

With continuing reference to FIG. 1(a), the effector frame 103 and effector 101 in this embodiment are located beneath the UAS 102 in its normal orientation. This location allows the effector 101 (e.g., a type of web-like screen in this embodiment) to remain clear of the propulsion system, shown as propellers 105 in this embodiment. In some configurations, the effector 101 and/or the effector 101 and effector frame 103 can be released from the UAS 102. Thus, as shown in FIG. 1(a), this configuration allows the effector 101 and/or the effector 101 and effector frame 103, to be released during an interception without entangling the interceptor's propulsion system.

FIG. 1(b) shows an alternative embodiment where the effector 101 is attached above the UAS 102. This configuration allows the effector 101 to help protect the UAS 102 from direct impact with the threat UAS during an attempted interception. However, this arrangement makes it more likely that the effector 101 will become entangled in the interceptor's propulsion system and disable the interceptor as well.

Figure 2:
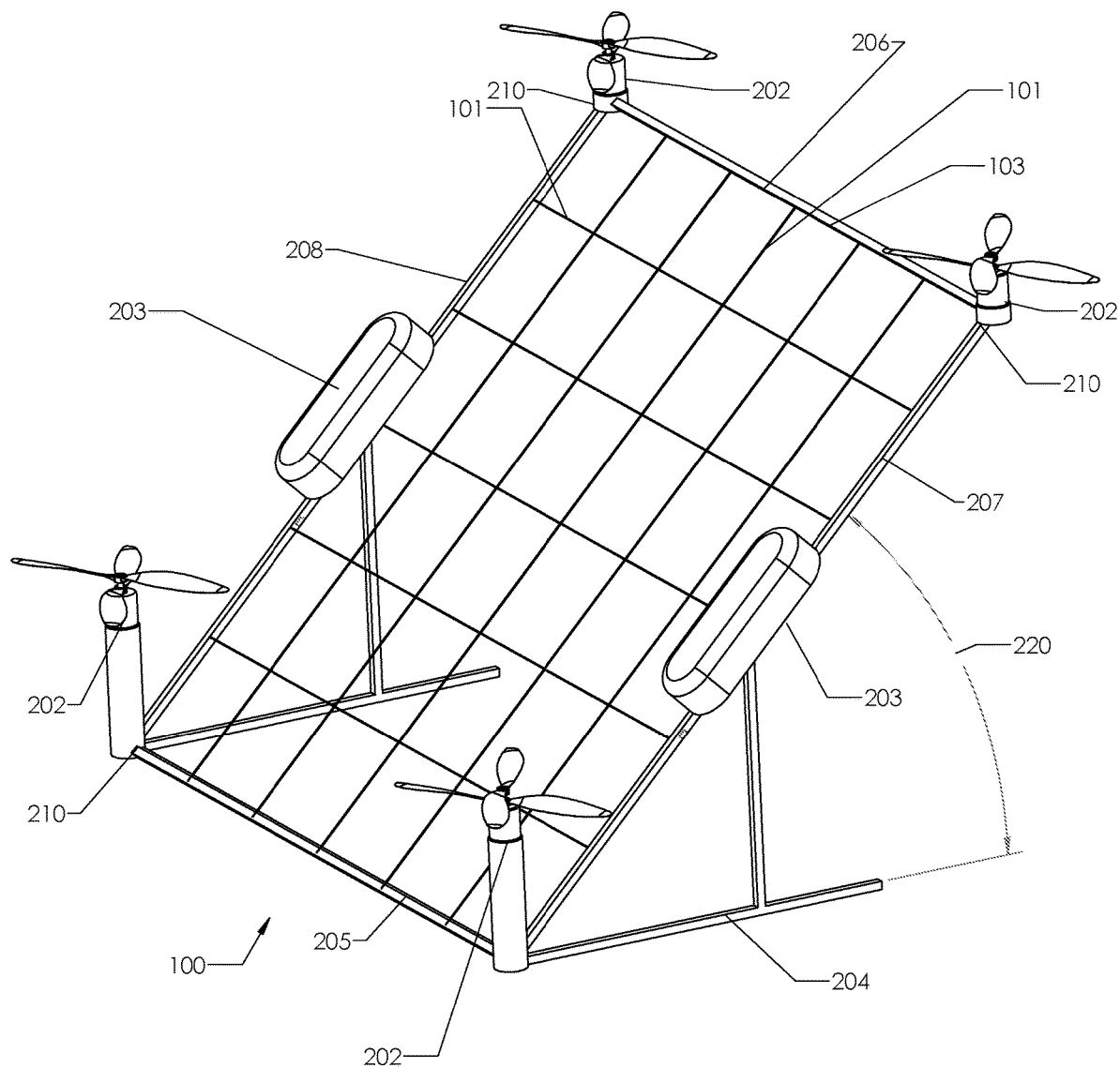
FIG. 2 shows another embodiment of the invention.

FIG. 2 depicts an alternate embodiment of the inceptor 100. In this embodiment, rather than utilizing a separate UAS 102 as shown in FIGS. 1(a) and 1(b), the interceptor 100 of this embodiment utilizes separate propulsion elements 202 to propel and control the interceptor 100. In this embodiment, the interceptor 100 can also utilize an effector frame 103 and effector 101 that largely make up the primary structure of the interceptor 100. The propulsion elements 202 shown in FIG. 2 are multiple rotors, and are an example of redundant propulsion systems that may be included to maintain control in the event one becomes disabled during the encounter. Although four (4) rotors are shown, any number of rotors could be used, for example, two (2), six (6), eight (8), etc. For example, if only two (2) propulsion elements 202 were used for the configurations shown in FIG. 2 or 3 (as examples), the propulsion elements 202 could be positioned at opposing corners (top left hand corner and bottom right hand corner) or positioned along the length (preferably the midpoint) along any of the opposing effector frame 103 arms, for example, in the locations shown for the energy storage devices 203. Preferably, the rotors are evenly spaced at, or near, the perimeter of the effector 101 and/or effector frame 103. This configuration operates in a manner similar to conventional multirotor aircraft (or UAS 102), and can be controlled similarly to a UAS 102 known to those of skill in the art. However, in this embodiment, the effector 101 and effector frame 103 serve as the main structural component and can be placed or positioned at an angle from horizontal to vertical to maximize the cross sectional area along the relative velocity vector during intercept. Typically the net is placed at an angle 220 between 45 and 60 degrees relative to horizontal, although other angles are possible. This angle and orientation can be achieved by the configuration of fixed propulsion elements 202 and effector frame 103, or using rotatable propulsion elements 202 described further below. For example, as shown in FIG. 2, the propulsion elements 202 are oriented and positioned vertically (i.e., having a vertical axis running through the propulsion element 202 housing), and their attachment to the effector frame 103 provide for this basic orientation when landed, or in operation (assuming equal lift/propulsion by the propulsion elements 202). By maximizing the cross sectional area, the likelihood of intercepting the threat UAS and disabling it is greatly increased. The configuration also allows for current low cost multirotor autopilots known to those of skill in the art to be used with little or no modification. In this configuration shown in FIG. 2, the batteries or other energy storage devices 203 are placed on the edges of the effector frame 103 to provide power for the propulsion elements 202. Additionally, optional landing legs 204 can be used. As shown in FIG. 2, the landing legs 204 are connected to the effector 101 and/or effector frame 103 to allow it to take off and land like a conventional multicopter. The self-propelled interceptor 100 shown in FIG. 2 also has the advantage of locating structure (e.g., the propulsion elements 202 and energy storage devices 203) behind the side of the effector 101 designed to intercept the target. As a result, the risk of damage or entanglement during the engagement is reduced. In addition, the configuration allows for the effector 101 to be released from the effector frame 103 (or release of the effector frame 103 and effector 101) and thus aid in recovery as discussed in further detail below.

Figure 3:
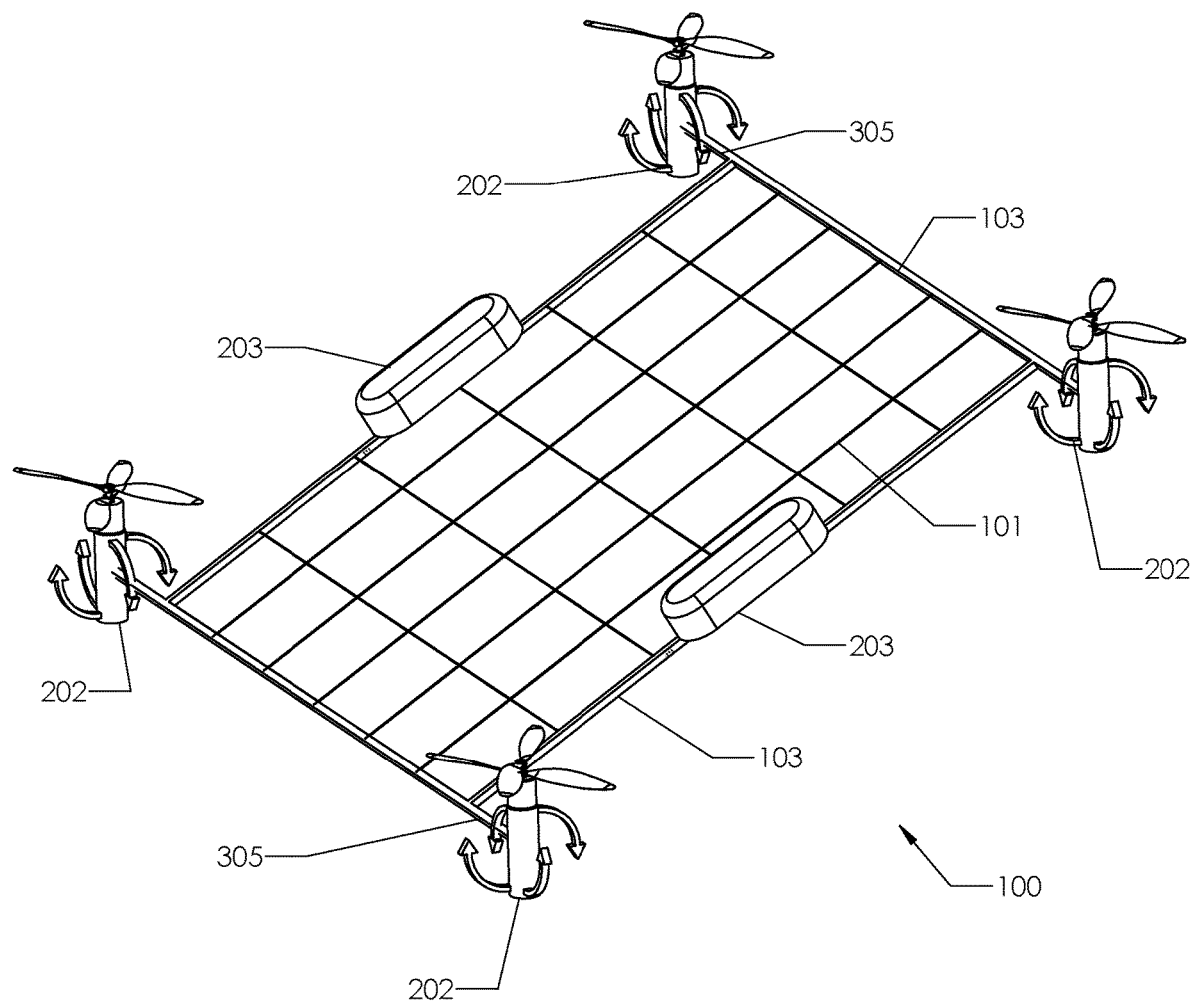
FIG. 3 shows another embodiment of the invention.

In some embodiments, propulsion elements 202 may be connected to the frame in a manner that allows them to be vectored (or moved/rotated) relative to the effector 101 and/or effector frame 103. As shown in FIG. 3, in some embodiments, propulsion elements 202 can be pivoted about 1 or more axes to enable the interceptor 100 to be positioned at the optimal orientation for the intercept. They can also change orientation throughout the intercept sequence while maintaining a desired direction of flight. This allows the interceptor 100 to be oriented in an optimal position with respect to the relative velocity vector, maximizing the cross sectional area of the effector 101 and thus the likelihood of interception. The optimal position and angle can be the same as described with respect to FIG. 2 above, and can be achieved through the pivoting of the propulsion elements 202 or differential power applied to the individual propulsion elements. Although a propeller blade of some propulsion elements 202 may spin in order to provide lift, when the propulsion elements 202 are described as able to be vectored or rotatable, it will be understood by those of skill in the art that the propulsion element 202 itself may be vector or rotatable relative to the effector frame and/or effector through various degrees of freedom, and "rotatable" does not refer to the circular motion of a propeller blade.

The propulsion elements 202 (e.g. motors with propellers in this embodiment) may be located at the edges of the effector frame 103 as shown in FIG. 3 or internally to the effector frame 103. As shown in FIG. 3, propulsion element supports 305 may be used to support the propulsion elements 202, and provide some spacing between the propulsion elements 202 and the effector frame 103 (which allows more room for rotation). In this embodiment, the propulsion element supports 305 extend outwardly from the effector frame 103, but can also be internal to the effector frame 103. In this embodiment, two or more motors may be used to provide both propulsion, lift, and directional control. These motors may pivot about one or more axes so the direction of the entire interceptor 100 can be controlled while independently controlling the orientation of the effector 101. Alternatively, the thrust may be vectored in place of vectoring the entire motor. The motors may be independently actuated or all motors may be actuated as a single unit. In the latter embodiment, 4 motors may be mounted to a common structure. This common structure is then pivoted relative to the effector. Additionally, while landing gear can be used in all the embodiments, landing gear may be removed (or excluded) or reduced in size as the interceptor 100 can be placed parallel to the landing surface during launch and recovery. Batteries or other energy storage devices 203 can be placed throughout the effector frame 103. Various locations for the energy storage devices 203 may be used, for example in separate storage pods shown in FIGS. 2 and 3 as the energy storage devices 203, in the effector frame 103 of the effector 101, and/or in the housing of the propulsion element 202. Batteries or other energy storage devices 203 can likewise be positioned or similarly configured in the other disclosed embodiments.

As shown in FIGS. 2 and 3 (among others), some embodiments utilize a rigid, fixed effector frame 103 that forms an outer perimeter of the interceptor 100, with the effector connected directly to the frame 103, and with propulsion elements 202 connected to the effector frame 103 and positioned at or proximate to the outer perimeter. Connection of the effector directly to the main flight frame allows for higher maneuverability and minimizes, if not eliminates, the risk of entangling itself. In other words, in many embodiments, the effector frame 103 is an integral part of the interceptor structure, allowing for significantly decreased weight, ability to reposition the effector relative to direction of motion and propulsion allowing optimal impact, and increasing the hit zone. As described herein, the propulsion elements 202 can be located outside of the perimeter (as shown in FIGS. 2 and 3) or inside of the perimeter.

In some embodiments (an example of which is shown in FIG. 2), the effector frame 103 is rectangular in shape, having a first end frame arm 205, second end frame arm 206, first side frame arm 207, and second side frame arm 208, said effector frame having four corners 210, and wherein a propulsion element 202 is positioned at each of said four corners 210. In some embodiments, an example of which is shown in FIG. 2, the landing legs 204 can be connected to the frame at the corners 210 and connected to the frame along the side frame arms 207, 208. Other configurations for the landing legs are known to those of skill in the art.

The effectors 101 may be fabricated from various components such as rigid rod(s), wire, string, rope, straps, or similar material, and composed of a variety of materials including but not limited to Kevlar, natural fibers, synthetic fibers, plastics, metals, and composites. In some embodiments, the effector 101 materials are flexible. In other embodiments, the effector 101 material is rigid. In yet other embodiments, the effector 101 includes both rigid and flexible materials. These materials can be attached to the interceptor 100 in a variety of configurations.

Various embodiments of effector frame 103 and effector 101 designs are shown in FIGS. 4(a)-4(i). In one embodiment shown in FIG. 4(a), frame arms 401 are extended in an "X" or cross configuration to make the effector frame 103 of the effector 101. The effector 101 material may then be strung between the frame arms 401 similar to a mesh screen ("mesh configuration"). The effector 101 material may be attached where it intersects the frame arms 401, only at the distal end 402 of the arms 401, or selectively at locations along the frame arms 401. The arms 401 may have openings, ridges, channels, or other structures that receive and/or fasten the effector 101 material. This type of frame could utilize the individual propulsion elements 202 shown in FIG. 2 and FIG. 3 (as examples), having the propulsion elements positioned at or proximate to the distal end 402 of the arms 401. In an alternate embodiment shown in FIG. 4(b), the effector 101 material may be placed from one arm 401 to the adjacent arm 401 forming a shape similar to a web ("web configuration").

Figure 4A:
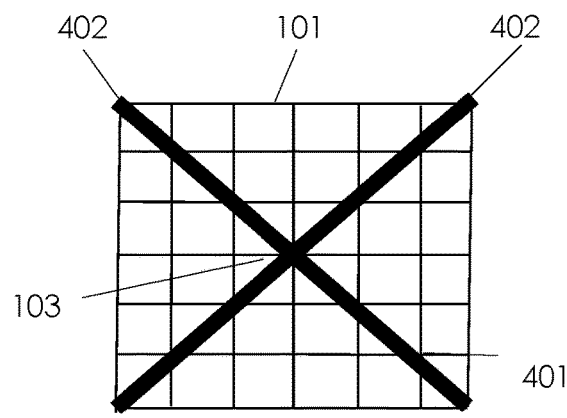
FIG. 4(a) is a top view of one embodiment of an effector frame and effector.
Figure 4B:
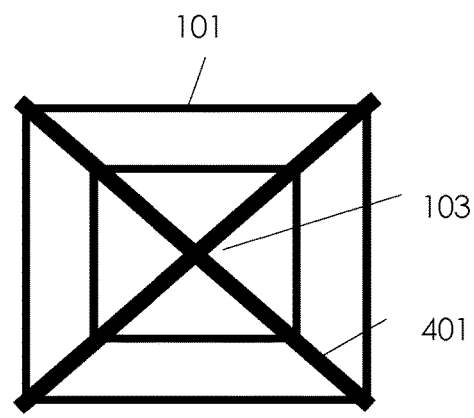
FIG. 4(b) is a top view of one embodiment of an effector frame and effector.
Figure 4C:
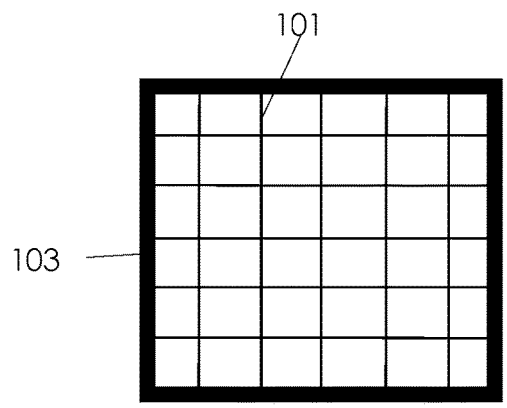
FIG. 4(c) is a top view of one embodiment of an effector frame and effector.
Figure 4D:
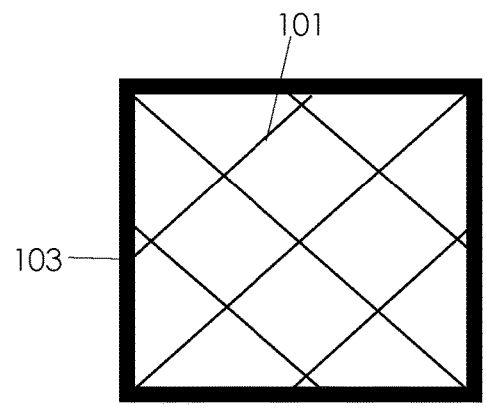
FIG. 4(d) is a top view of one embodiment of an effector frame and effector.

Alternatively, as shown in FIGS. 4(c) and 4(d), an effector frame 103 may make up the outermost structure of the effector frame 103/effector 101 combination, with effector 101 materials placed inside the effector frame 103. FIG. 4(c) shows the effector 101 materials running substantially vertically and horizontally (with respect to the individual frame arms), whereas FIG. 4(d) shows the effector 101 materials intersecting the frame at approximately a 45 degree angle. While the spacing of the effector 101 materials is generally shown as uniform, the effector 101 can be configured to have different spacing throughout.

The spacing and orientation of these materials can be varied and optimized to allow of entrapment of the threat UAS. The effector 101 materials are preferably placed such that components of the threat UAS are allowed to initially pass through the effector 101 but then become captured. A spacing of $\frac{1}{3}^{rd}$ the cross section of the threat UAS has been shown as effective. Typical small UAS are 18 inches across and 9-12 inches tall. A spacing of 6 inches between the individual effector 101 materials works well for this size UAS as it allows for a propeller, motor arm, or landing gear to pass through and then become entangled in the material. Thus, in some embodiments the spacing between the effector 101 materials is between 1 and 24 inches. More preferably, the spacing between the effector 101 materials is between 3 and 12 inches. The spacing may obviously be greater or smaller depending on the threat UAS. This allows components of the threat UAS such as propellers, motor arms (or propulsion element supports), and landing gear to initially pass through the spaces in the effector 101. The momentum of the threat UAS then pulls it away from the effector 101, causing components of the threat UAS to slide along the materials and become entangled or entrapped by the effector 101.

Additional embodiments are shown in FIGS. 4(e)-4(i). In one embodiment shown in FIG. 4(e) (side view of the effector frame 103), loose material 405 can be dangled from the effector frame 103 to act as an entangling device. In similar embodiments (not shown), the loose material 405 can be dangled from the effector 101 material. The loose material 405 could be made of materials similar to that used for the effector 101 materials. In an additional embodiment shown in FIG. 4(f) (side view of the effector frame 103), hooks 406 can be dangled from the effector frame 103 to act as an entangling device. In similar embodiments (not shown), the hooks 406 can be dangled from the effector 101 material. Similarly, in addition to loose material 405 and/or hooks 406, the entangling device extending from the effector frame 103 and/or effector 101 material could also be lines, magnets, adhesive pads, or other methods of physical attachment. Any of these entangling devices can catch on the body and components of the threat UAS, thereby attaching it to the interceptor 100.

In an alternate embodiment shown in FIG. 4(g), a combination of loose material 405 and hooks 406 can be used, and can extend from the effector frame 103 and/or the effector 101 material.

FIG. 4(h) shows a top view of one embodiment having just the effector frame 103 and hooks 406 (connected to the effector frame 103). Thus, in some embodiments, a separate effector 101 may not be utilized. FIG. 4(i) shows another alternative embodiment utilizing an effector frame 103, effector 101, and showing attachment points 410 for loose material 405, hooks 406, other entangling devices, or any combination thereof. The entangling devices may also be attached to the effector frame 103.

Upon intercept of the threat UAS, the effector 101 material may remain attached to the effector frame 103 as it was before engagement. In some embodiments, some portions of the effector 101 material may be dislodged or pulled away from the effector frame 103, while other portions of the effector 101 material remains attached to the effector frame 103. In other embodiments, the effector 101 material is completely disengaged from the effector frame 103. In other embodiments, the effector 101 material and effector frame 103 are disengaged from the UAS.

Figure 5A:
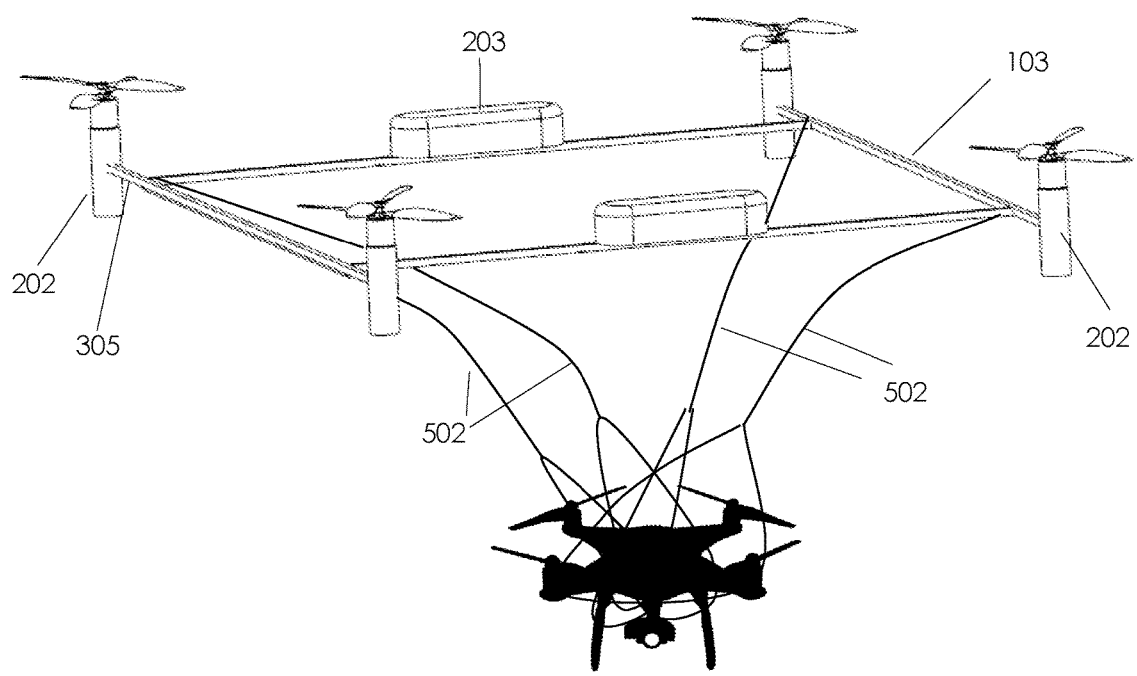
FIG. 5(a) shows one embodiment with a captured threat UAV.

After the threat UAS has been captured by the effector 101, several configurations exist to recover the interceptor 100 and threat UAS aircraft. In the simplest form, the threat UAS and interceptor 100 become connected and spiral to the ground in either a controlled or uncontrolled manner. Two additional options of recovering the threat UAS aircraft to a predefined recovery site are depicted in FIGS. 5(a) and (b). In one embodiment shown in FIG. 5(a), the threat UAS becomes entangled in flexible effector 101 material strung between the effector frame 103. The force of impact separates the effector 101 from the effector frame 103. One or more tethers 502 connected to the effector 101 and effector frame 103 allow the effector 101 and threat UAS to hang below the interceptor 100. The tethers 502 can be made of materials similar to that of the effector 101 material. In this embodiment, the configuration of the connection between the effector 101 material and the effector frame 103 are designed such that the force created by interception of the threat UAS allows the effector 101 material to disengage (or break away) from the effector frame 103, but the connection between the tethers 502 and effector frame 103 (or the strength of the materials from which the tethers 502 are made) is sufficiently strong to keep the tethers 502 engaged with the effector frame 103.

Figure 5B:
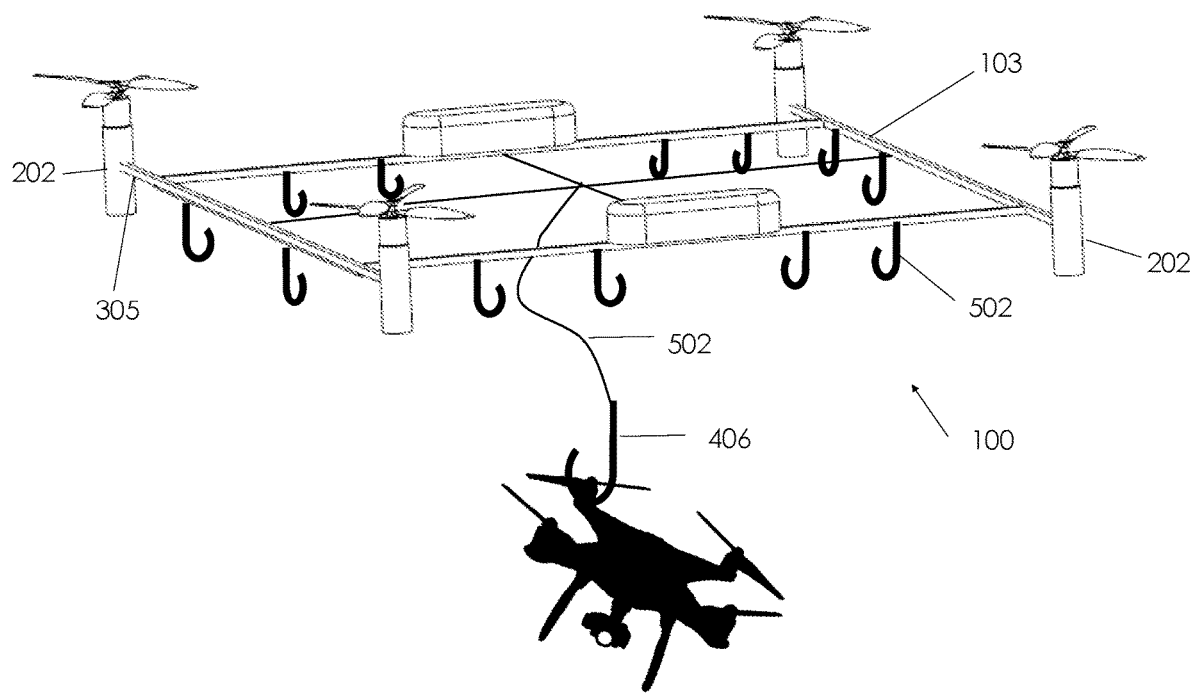
FIG. 5(b) shows one embodiment with a captured threat UAV.

An alternative embodiment is shown in FIG. 5(b) showing hooks 406 attached to the effector frame 103 and effector 101 material, with one hook 406 entangled with a threat UAS connected by a tether 502 which is connected to the effector 101 material. In this embodiment, upon engagement, the effector material 101 and effector frame 103 are designed such that the force created by interception of the threat UAS allows the hook 406 to disengage (or break away) from the effector frame 103 and/or effector 101 material, but the connection between the tether 502 and effector frame 103 and/or effector 101 material is sufficiently strong to keep the tethers engaged with the effector frame 103 and/or effector 101 material.

Similar disengagement (or break away) of the effector 101 material can be utilized with the alternative configurations, for example, the configurations shown in FIGS. 1(*a*), 1(*b*), 2, 3, FIGS. 4(*a*)-(*i*), etc. Additionally, in other embodiments, rather than the effector disengaging from the effector frame 103, the effector frame 103 and effector 101 material can disengage or break away from the UAS 102 (for example, as shown in FIGS. 1(*a*) and (*b*)), and the tethers 502 can be configured to remain between the UAS 102 and the effector frame 103 and/or effector 101.

As shown in FIGS. 5(*a*) and (*b*), by hanging below the interceptor 100, the threat UAS acts as a slung load and is easier to control and carry back to the predetermined recovery location. In some embodiments, the tethers 502 are interconnected. Thus, in the event that the threat UAS catches further to one side of the effector 101 than the other, having tethers 502 interconnected within the effector frame 103 helps to ensure the load is balanced and does not overpower the controls of the interceptor 100. As the tethers 502 deploy, the weight of the threat UAS pulls on each tether 502 until the forces among the tethers 502 are balanced. This ensures that the threat UAS is slung centered below the interceptor 100. In addition to transitioning the captured threat UAS to a slung load, the use of tethers 502 also helps to reduce the force of the sudden impact by lengthening the duration of the capture dynamics. The deployment of the tethers 502 also allows effector 101 materials to further wrap around the threat UAS and secure it. In place of the tethers 502, or in combination with the tethers 502, elastic material may also be used to help dampen the shock created by the interception, and to facilitate sling loading the threat UAS.

Figure 6:
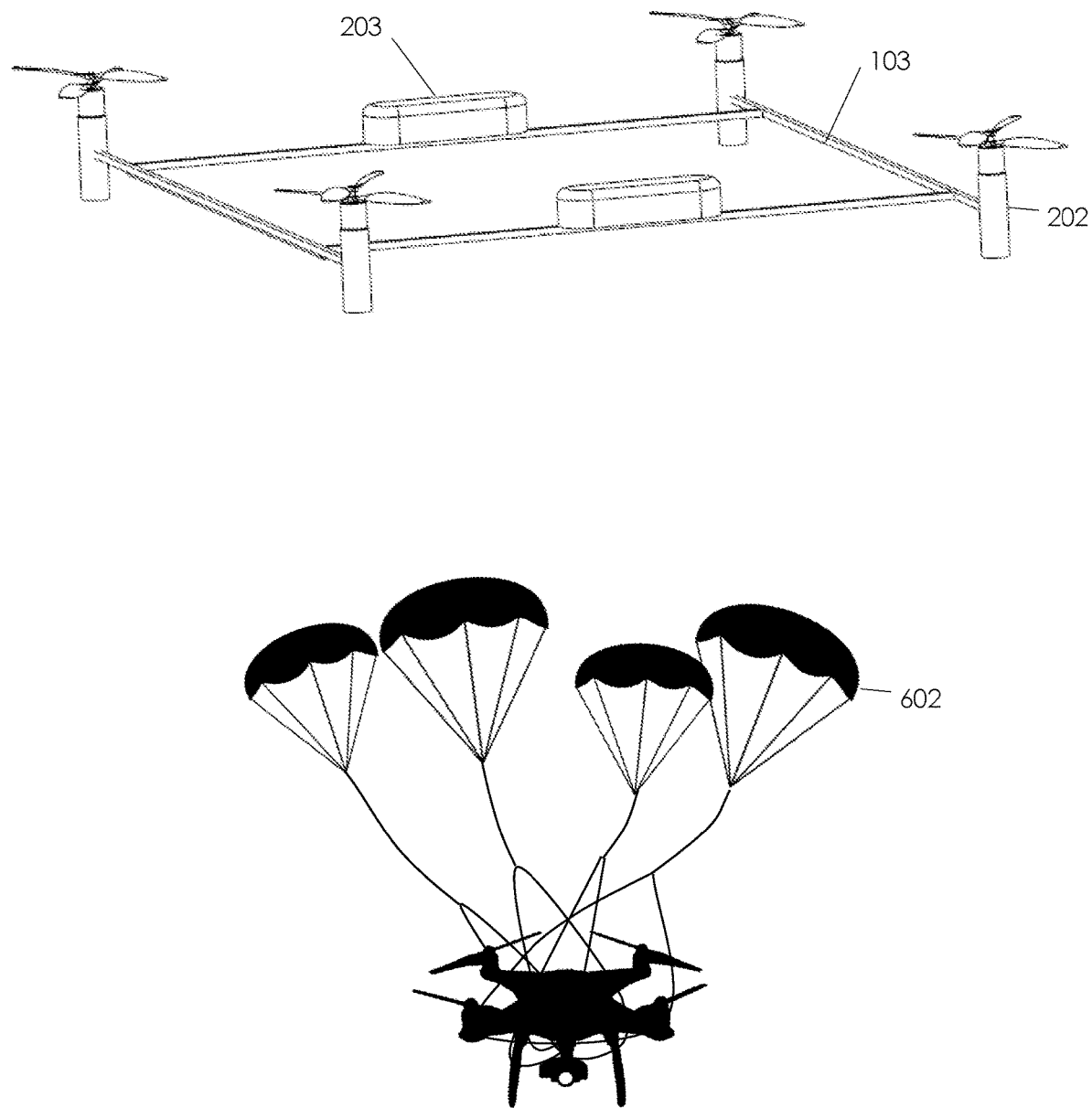
FIG. 6 shows another embodiment of the invention with a disabled threat UAV.

Another embodiment is shown in FIG. 6. This configuration may optionally be used if the interceptor 100 is unable (or it is not desired) to carry the threat UAS after intercept. In this configuration, instead of the effector 101 being connected to the effector frame 103 via tethers 502, it is instead connected to one or more parachutes 602. As the threat UAS impacts the effector 101, the effector 101 is torn away, disengaged, or released from the interceptor effector frame 103. As the effector 101 separates, it deploys one or more parachutes 602. The parachutes 602 may either be integral to the effector 101 or stored in the effector frame 103 and pulled out by the force of impact and separation of the effector 101 from the interceptor 100, similar to the discussion above regarding FIG. 5.

A large effector 101 coverage area increases the likelihood of interception. As a result, the deployed size of the interceptor 100 can be large and thus takes up extensive storage space prior to launch. In addition to the different interceptor frame configurations, additional embodiments allow for the large interceptor 100 and associated effector 101 systems to be decreased in size for storage and deployment. In some embodiments, the effector frame 103 used to suspend the effector 101, and/or provide the attachment for loose material 405, hooks 406, other entangling devices, or any combination thereof, is foldable, collapsible, and/or modifiable in length or orientation between a deployed state (e.g., operational, and ready for intercept) and a stored state. For example, various frame arms 401 may have hinges or pivot points 703 that allow an arm 401 (or other portion of the effector frame 103) to be folded, effectively cutting the length of a particular arm 401 (or other portion of the effector frame 103) in half. Multiple hinges or pivot points 703 can be used to shorten the stored length even further. In other embodiments, the frame may utilize telescoping members (or frame arms 401) that can be collapsed within each other for storage. Preferably, standard locking mechanisms known to those of the art can be used to lock the frame members in the extended configuration when in use. The effector frame 103 and various components can be modular, and provide connections at intersections between frame members so that various sizes and configurations can be provided.

Figure 7:
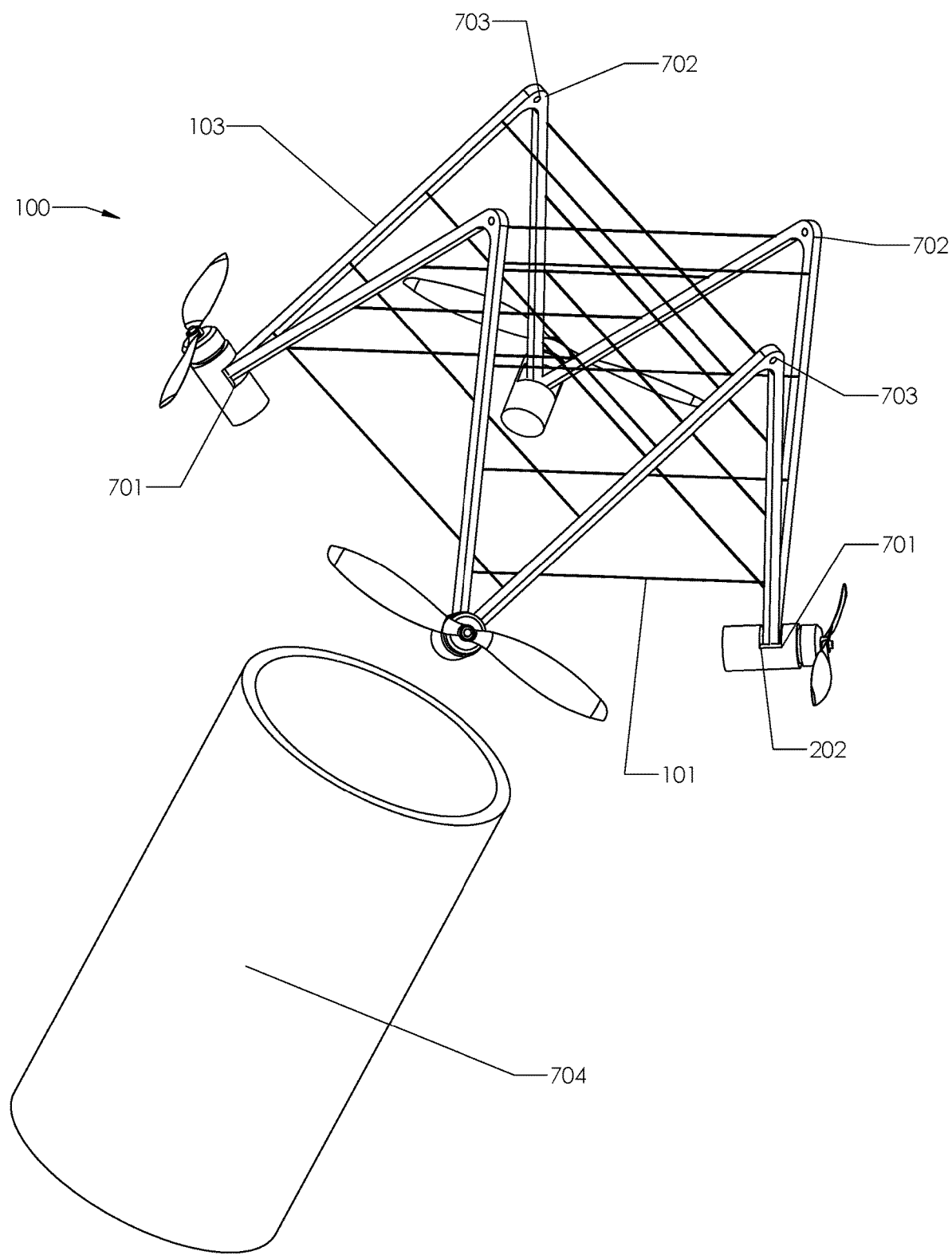
FIG. 7 shows another embodiment in a semi-folded, partially deployed configuration.

In one embodiment, shown in FIG. 7 (in partial deployment form), the effector frame 103 pivots and rotates along the motor (or propulsion elements 202) locations 701 and folds frame mid span 702 along the outer effector frame 103 along the frame arms 401. As shown in FIG. 7, the interceptor 100 system is in a semi-collapsed state. Springs are optionally located in the effector frame 103 or at the pivot points 703 and used to torque the effector frame 103 into the proper orientation upon deployment (like that shown in FIGS. 2 and 3, as examples). In some embodiments, in addition to the springs, or as the sole means of deployment, the motors (or propulsion elements 202) are powered and the thrust they produce forces the effector frame 103 into the locked position upon deployment. The interceptor 100 system can be deployed in a variety of ways, including deployment by tossing it into the air (in collapsed or un-collapsed state), dropping it out of a container 704, or launching it from a container 704, etc. For a container 704 launch, the interceptor 100 system can be collapsed inside a tube. A compressed gas, spring, or explosive can be used to force the interceptor 100 out of the tube, at which point a separate deployment mechanism is enabled (to move the interceptor 100 system to an operational un-collapsed state), or the system is configured such that the force of ejection from the container 704 (or the configuration of the arms 401, hinges/pivot points 703, springs, etc.) automatically moves the interceptor 100 system to the operational un-collapsed state. By using a tube launched storage method, numerous interceptors 100 can be packed into a very small volume.

Guidance of the interceptor may be conducted either manually (as is well known to those of skill in the art) or autonomously. One embodiment of the interceptor 100 system is fully automated and autonomous, and discussed further below. The interceptor 100 system may separately interact with other sensors, tracking systems, and communication systems as described herein. The sensors, tracking systems, and communication systems may be discrete systems configured to interact and communicate, or they may form one integral system, and are well known to those of skill in the art. For convenience, apart from the interceptor 100 and its various components, this system will be referred to as the guidance system. The guidance system may be housed on and part of the interceptor 100, or it may be ground based, with wireless communication to the interceptor 100 using standard communication technology and components such as RF, cell phone, or other forms of wireless or wired data transmission.

Figure 9:
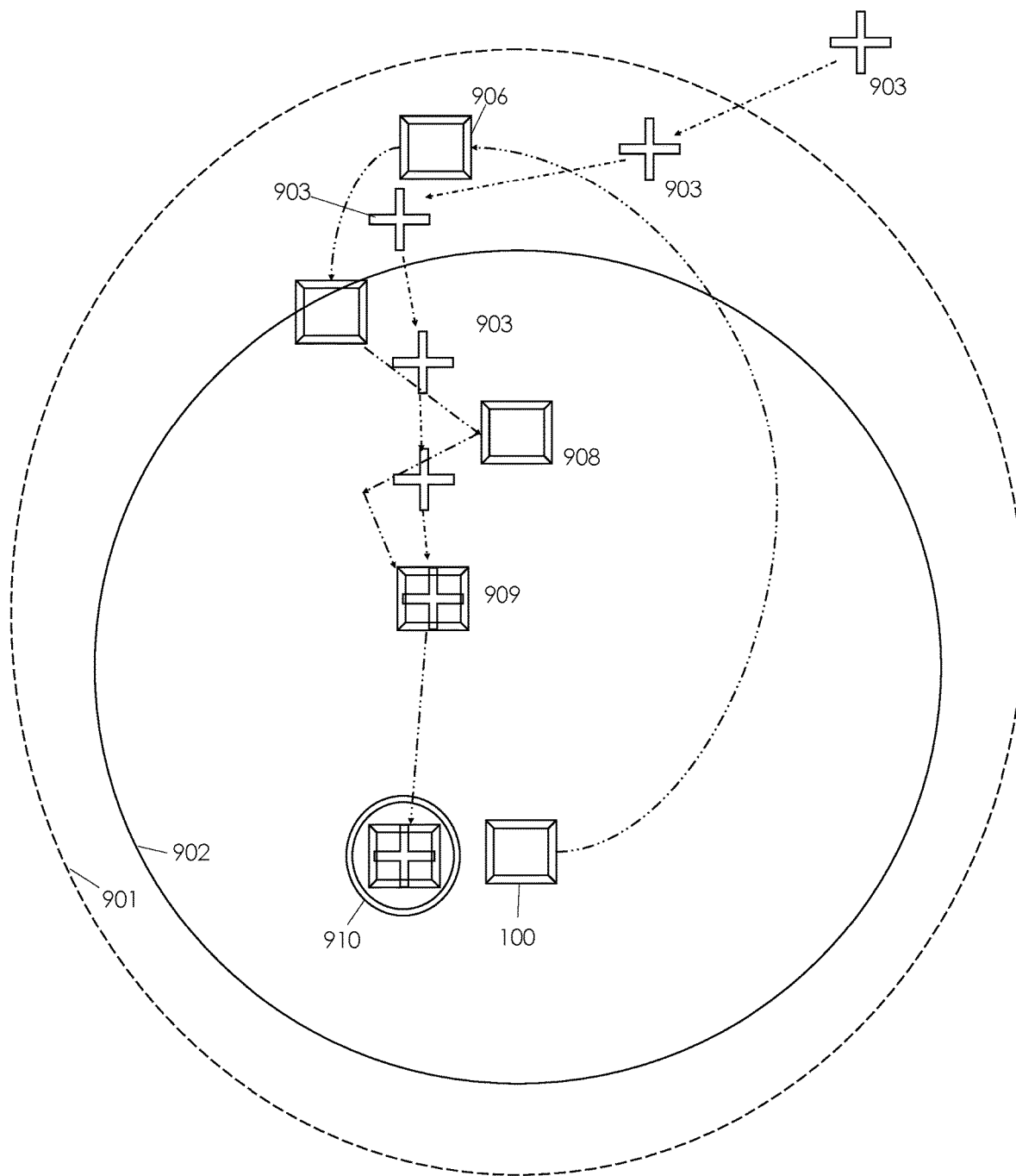
FIG. 9 shows one embodiment of an engagement sequence.

In one exemplary embodiment shown in FIG. 9, two zones are identified in the guidance system, an outer warning zone 901 and an inner defended zone 902 (a sub-region within the warning zone 901). The size and configuration of the outer warning zone 901 and inner defended zone 902 can be selected by a user (for example, a 10 mile circumference and a 5 mile circumference, respectively, around a particular location/asset), or prepopulated with default or selectable options. A sensor detects, tracks, and identifies the target 903, normally a threat UAS. Sensors for detecting, tracking, and classifying targets 903 are well known to those of skill in the art, and not repeated here. Once the target 903 is identified and within the outer warning zone 901, the guidance system and interceptor may begin an automated engagement sequence. At this point, an operator may be given the opportunity to hold or abort the automated process. While the threat UAS is in the warning zone 901, the interceptor 100 takes up an escort position 906. In this mode, onboard sensors on the interceptor 100 may provide final confirmation of the target 903. Once the threat UAS enters the defended zone 902, the interceptor 100 may automatically begin the intercept procedure. In the event that the interceptor 100 misses on the first pass, the system automatically re-engages and commences a second pass. This repeats until capture of the threat UAS is confirmed, designated as the capture position 909. Once captured, the system automatically returns the threat UAS to a predefined recovery location 910. The interceptor propulsion system may then replenished, the engagement mechanism is reset, and the interceptor 100 may be placed back into or onto the launch apparatus, or otherwise readied for deployment.

In some embodiments, autonomous intercept guidance is achieved by the use of ground-based sensors, onboard sensors, or a combination of the two. In the ground-based configuration, guidance is provided by one or more sensors providing the position of the interceptor 100 and threat UAS aircraft. The sensors act in a manner similar to current air defense systems. In one embodiment, the system uses one or more ground based sensors for detection and tracking for threat UAS. The location of the interceptor 100 may be provided by GPS or in the event of GPS denied environment, position information is provided by ground-based or other sensors. A ground based sensor provides measurements of the threat UAS, allowing guidance commands to be calculated. When executed, these guidance commands position the interceptor 100 in the vicinity of the threat UAS. A combination of measurements from more precise ground-based sensors can be used to augment terminal guidance for the intercept at an azimuth and elevation resolution finer than available from the ground-based sensor.

Figure 8:
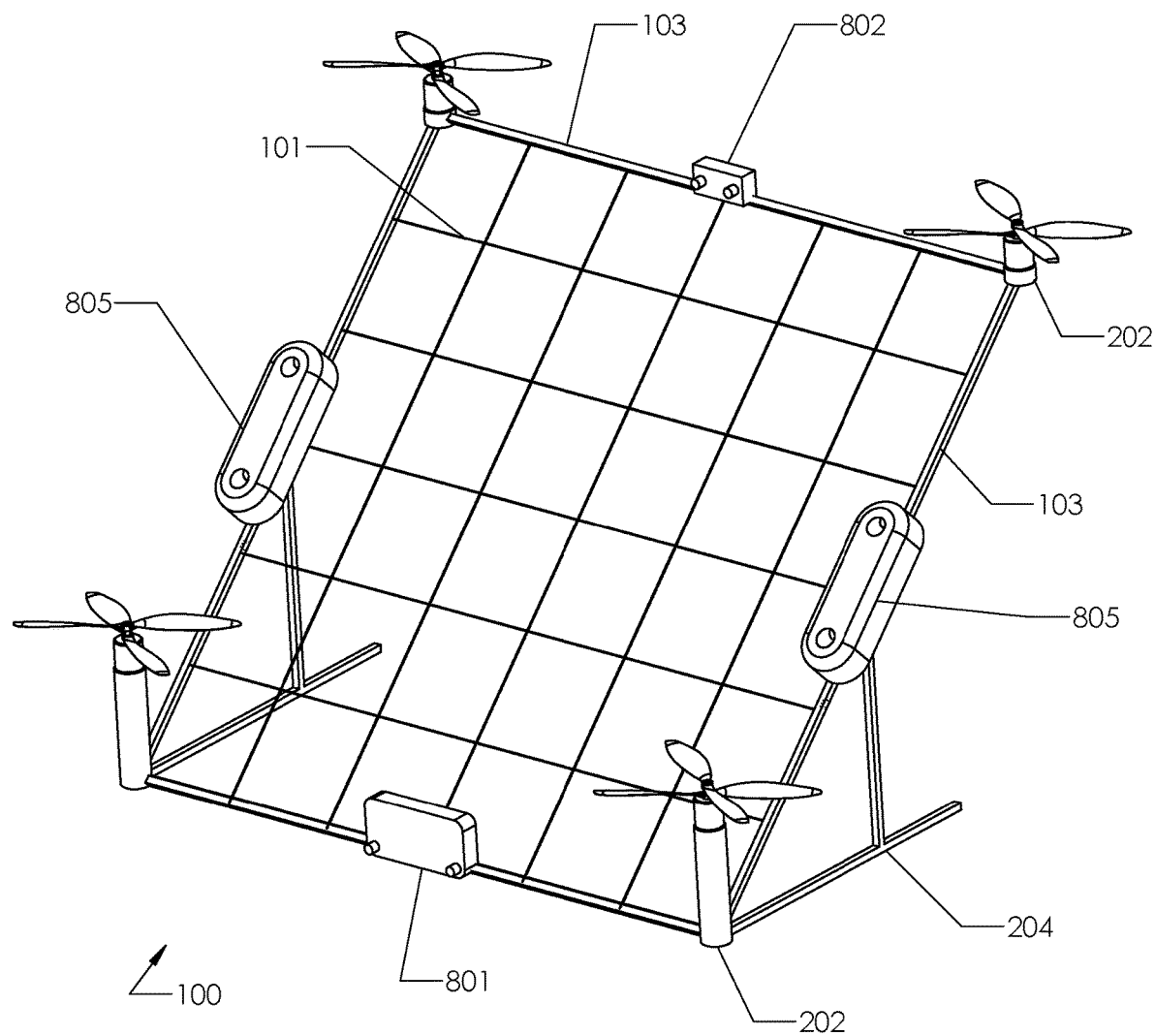
FIG. 8 shows another embodiment using onboard sensors for intercept guidance.

In an alternate embodiment, airborne sensors are used for intercept guidance. Initial detection and tracking may be provided by either a ground based sensor or onboard sensors. Once the target is acquired by the onboard sensors, the onboard sensors are used to measure the relative position of the threat UAS. These measurements enable the calculation of guidance commands that position the interceptor in the vicinity of the threat UAS. A wide combination of sensors may be used, one exemplary embodiment of which is shown in FIG. 8. In this embodiment, a radar 801 is located on the bottom of the effector frame 103 to provide long range guidance in poor visibility. A LIDAR sensor 802 is located on the top of the effector frame 103 to enable short-range guidance as well as obstacle avoidance. The onboard guidance system/pods 805 on each side of the effector frame 103 may contain distance sensor(s) and/or camera, or other guidance systems to assist in intercept. Additional distance sensors and cameras may be placed on the top and bottom of the effector frame 103 with the radar 801 and LIDAR sensor 802 to enable target tracking and obstacle avoidance. By placing the cameras on all four sides, the rate of change of the line of site to the threat UAS can be calculated with high accuracy. This measurement may also be accomplished with the radar 801 and LIDAR sensors 802. The onboard guidance system/pods 805 can be housed with the energy storage devices 203. The radar 801, LIDAR sensors 802, cameras, distance sensors, and acoustic or ultrasonic sensors used for guidance, target tracking, and/or obstacle guidance may be collectively referred to herein as "object sensing devices."

Terminal guidance uses a combination of dog fighting tactics and missile pursuit guidance. Initial staging/positioning and re-engagement is handled by an outer control loop. This control loop is responsible for placing the interceptor UAS in an optimal position to defend against a threat UAS. In one embodiment, once the attack decision has been made, the guidance system switches to a Proportional Navigation (commonly referred to as "ProNav") guidance algorithm to intercept the threat UAS. During the intercept process, the outer loop continuously monitors the closure rate between the interceptor and threat UAS. If the outer loop determines that the interceptor is no longer closing on the threat UAS or that the interceptor has missed as indicated by a negative rate of closure, the outer loop will regain control and reposition for subsequent attempts at intercepting the threat.

The combination of pursuit missile guidance with a smart outer loop control and re-engagement tactics applied to an unmanned aircraft system is unique. This combination allows for the long history and knowledge of missile guidance theory to be applied to a new vehicle type and method of employment. When combined with the ability to position the effector at any angle relative to the flight path, for example, by using the interceptor depicted in FIG. 3, the system achieves engagement orientations never before possible. Additionally, the effector rapidly re-orients if additional interception attempts are required.

The autonomous intercept system is also capable of commanding a "many on one" or a "many on many" intercept. In the "many on one" configuration, multiple interceptors are launched to defend against one threat UAS. In some embodiments, two methods are used during the intercept in this configuration. The "simple swarm intercept" sequences individual members of a swarm of interceptors to minimize the time between intercept passes. Using this method, by the time the first interceptor misses, a second interceptor has already initiated an attack from an alternate angle. Alternatively, an "advanced swarm intercept" uses techniques used in nature by animal predators, such as dolphins. Using this technique, several interceptors are used to drive the threat UAS aircraft toward an identified interceptor. This method proves efficient against threat UASs with their own obstacle detection and avoidance systems. By driving the threat UAS into the identified interceptor, blind spots on the threat UAS aircraft are exploited. Advanced versions recognize avoidance patterns and thus place an interceptor in the identified avoidance path or in known blindspots for the avoidance algorithm.

For "many on many" intercepts, the same techniques are used in order to defeat simultaneous attacks by multiple threat UAS. However, algorithms for sorting and ordering priorities are added on top of the many-on-one logic.

Figure 10A:
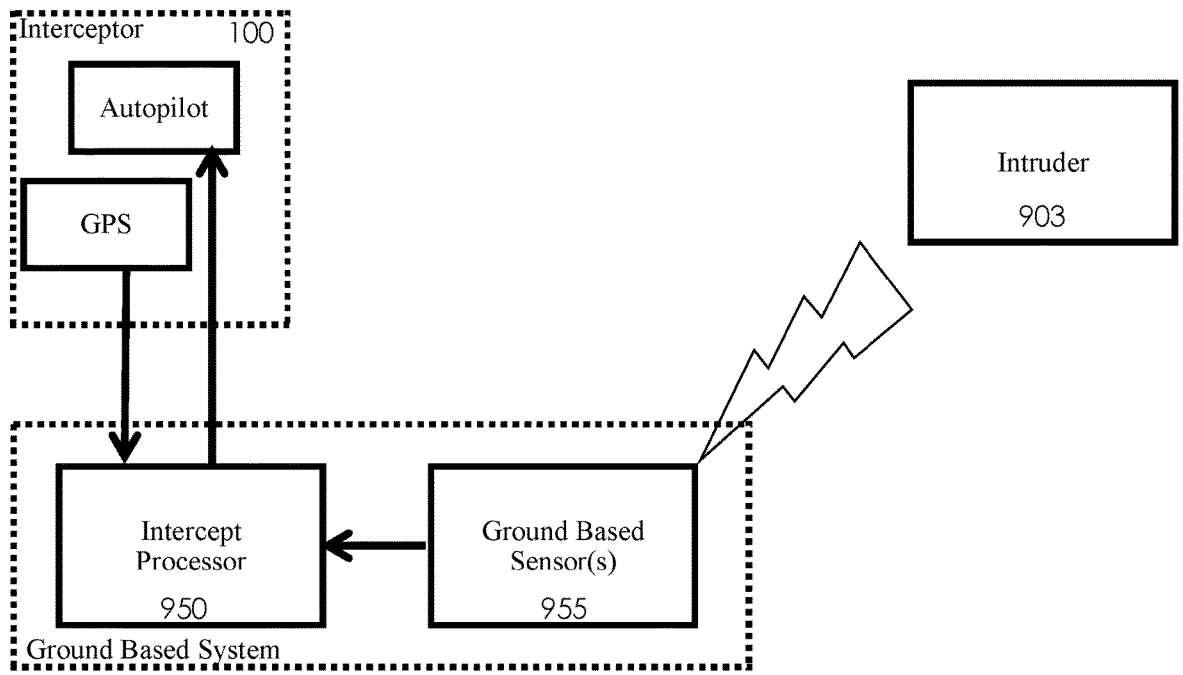
FIG. 10(a) shows a simplified system block diagram of one embodiment.
Figure 10B:
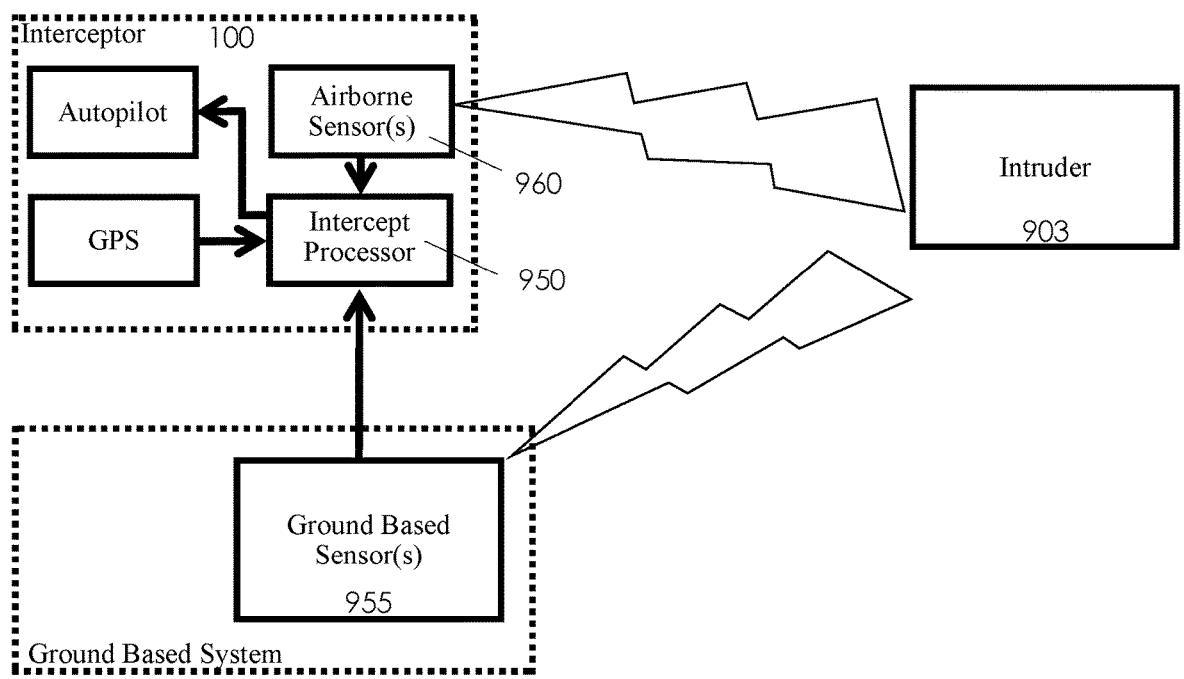
FIG. 10(b) shows an alternative simplified system block diagram of one embodiment.

Various exemplary embodiments of different interceptor 100 and ground based sensors configurations are shown in FIGS. 10(*a*) and (*b*). Several methods exist for controlling the interceptor UAS. At the simplest level, as shown in FIG. 10(*a*), a "Intercept Processor" 950 located on the ground uses ground based sensor(s) 955 to collect ground based sensor data and sends X-Y-Z velocity commands to the interceptor 100. This method allows for easy integration with ground sensors 955 and allows for a wide range of interceptors 100 to be used with little or no modifications, as none of the intercept software is located on the interceptor 100 aircraft. The intercept processor 950 hosts the intercept software and algorithms, and receives information from the ground based sensor(s) 955 and the interceptor 100. It then uses guidance and control algorithms to calculate the velocity or acceleration commands required to intercept the threat or target UAS 903, and sends those commands to the interceptor 100. Additionally, the ground based systems allows for simple integration of many aircraft for swarm operations.

An additional embodiment for controlling the interceptor 100 aircraft, shown in FIG. 10(*b*), uses the intercept processor 950 hosting the intercept software onboard the interceptor 100 UAS. In this configuration, data is passed from a ground based sensor 955 or onboard sensor 960 to the intercept processor 950. This configuration has the benefit of low latency and easier integration with an onboard sensor 960 for terminal guidance. It can also operate in a jamming environment as all sensing and command are performed onboard the interceptor 100.

When swarms of interceptor 100 aircraft are used alternative embodiments are possible, via air-to-air communication implemented via point-to-point and/or mesh radio networks. In this embodiment, command and control is distributed throughout the swarm of multiple interceptor 100 aircraft. Each aircraft coordinates with the other members of the swarm, and communicates measurements and status information between them. Using this configuration, the aircraft are able to coordinate their operations with little or possibly no input from a ground station. Additionally, because the processing is distributed throughout the swarm, if one aircraft is disabled, the functions are shared with the remaining aircraft allowing the swarm to continue with defense against attacks from threat UAS.

Figure 11A:
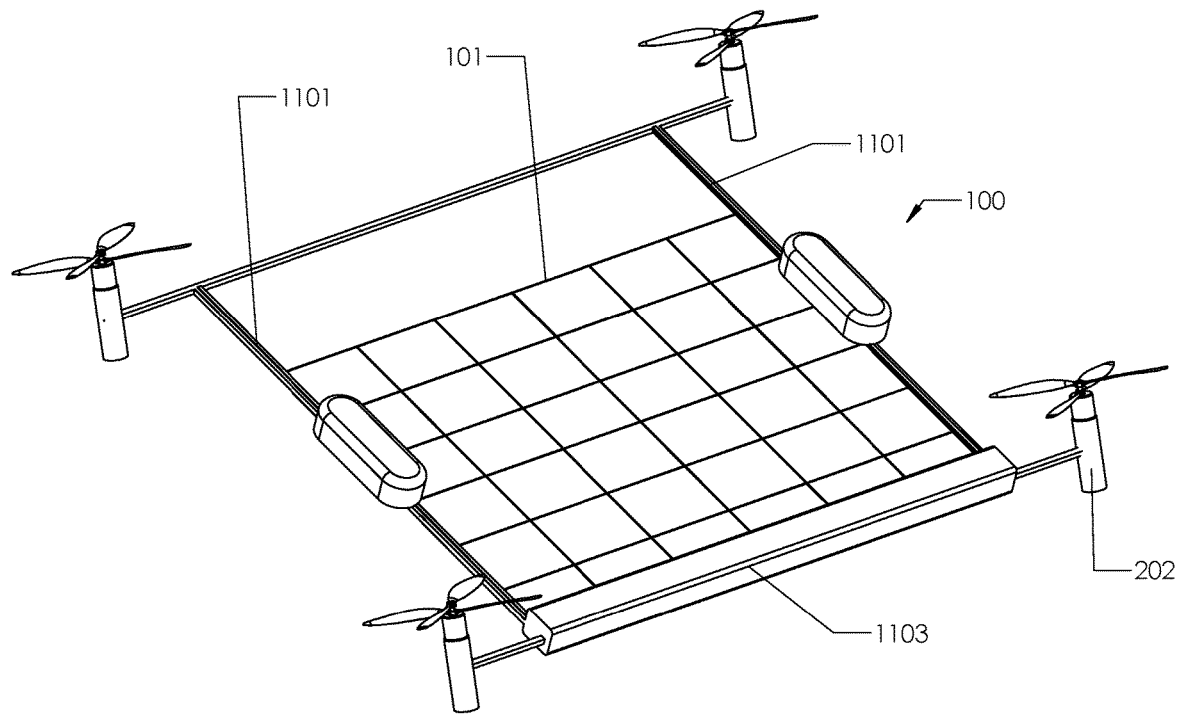
FIG. 11(a) shows one embodiment of an effector frame and replaceable effector.
Figure 11B:
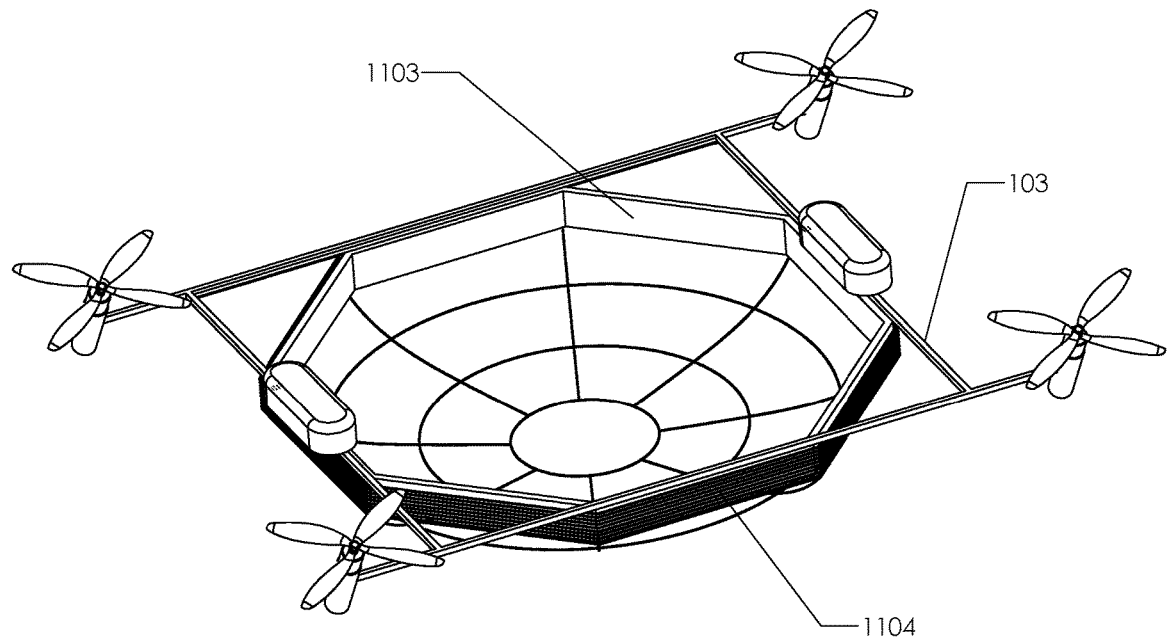
FIG. 11(b) shows another embodiment of an effector frame and replacement effector.

For effectors that entirely separate from the frame, replacement effectors can be used. Two example configurations are discrete replacement and roll replacement. In discrete replacement, an exemplary embodiment of which is shown in FIG. 11(*a*), tracks 1101 on the effector frame 103 of the interceptor 100 support the effector 101 material. When the effector 101 becomes entangled and separates from or is released from the effector frame 103, another effector 101 is deployed. This redeployment can be triggered by any number of means known to those of skill in the art, including but not limited to by an electrical-mechanical system that physically pulls or pushes the replacement effector into place or via a spring mechanism that once the first effector is torn free, a replacement is automatically installed. Several additional effectors can be preinstalled on the interceptor 100, and housed in a replacement effector storage compartment 1103 (for example, similar to a paper towel roll), before flight allowing for multiple engagements in a single flight.

An alternate embodiment shown in FIG. 11(*b*) uses a series of continuous tear away effectors housed in a replacement effector storage compartment 1103 and integrated around the engagement area 1104. In one embodiment, the effector 101 consists of an elastic or compressible type material with an opening (or hole) in the middle so that replacement effectors can be stored in the replacement effector storage compartment 1103. The effector 101 is configured such that when the first effector 101 is deployed, it is secured around its perimeter to the replacement effector storage compartment 1103, and the replacement effector storage compartment secured to the frame 103. In alternative embodiments, a separate frame 103 is not required, and the replacement effector storage compartment 1103 can also effectively act as the frame 103, and the propulsion elements 202 could be attached to the replacement effector storage compartment 1103. In some embodiments, the effector 101 material is elastic and/or compressible that stretches when loaded into the replacement effector storage compartment 1103, and when deployed, returns to its natural, relaxed configuration as shown in the deployed effector in FIG. 11(*b*). The series of effectors can be configured or connected in a manner such that when the deployed effector 101 is torn away or released from the replacement effector storage compartment 1103, it pulls the next effector into position (similar to how pulling one tissue from a box deploys the next tissue).

What is claimed is:

1. An interceptor unmanned aerial system comprising:
a rigid, fixed effector frame forming an outer perimeter of the interceptor unmanned aerial system;
an effector attached directly to the frame such that the effector spans between at least two sides of the frame, wherein the effector is releasable from the effector frame;
at least two propulsion elements connected to the effector frame and positioned at or proximate to said outer perimeter; and
at least one replacement effector positioned in a replacement effector storage compartment connected to the effector frame, wherein said replacement effector is configured to deploy upon release of the effector.

2. The interceptor unmanned aerial system of claim 1, wherein the propulsion elements are located inside said perimeter.

3. The interceptor unmanned aerial system of claim 1, wherein the propulsion elements are located outside said perimeter.

4. The interceptor unmanned aerial system of claim 1, wherein the propulsion elements are rotatable relative to the effector frame.

5. The interceptor unmanned aerial system of claim 1, further comprising energy storage devices positioned on the effector frame forming the outer perimeter of the interceptor unmanned aerial system.

6. The interceptor unmanned aerial system of claim 1, wherein the effector frame is rectangular in shape, said effector frame having a first end frame arm, second end frame arm, first side frame arm, and second side frame arm, said effector frame having four corners, and wherein said at least two propulsion elements comprises four propulsion elements, and wherein a propulsion element of said four propulsion elements is positioned at each of said four corners.

7. The interceptor unmanned aerial system of claim 6, further comprising at least two landing legs.

8. The interceptor unmanned aerial system of claim 7, wherein at least one of the at least two landing legs is connected to the frame at one of said corners and connected to the frame at one of said first side frame arm or second side frame arm.

9. The interceptor unmanned aerial system of claim 1, further comprising a parachute connected to the effector and configured to deploy when the effector is released from the effector frame.

10. The interceptor unmanned aerial system of claim 1, wherein the effector frame is positioned between 45 and 60 degrees relative to horizontal when said propulsion elements are positioned vertically.

11. The interceptor unmanned aerial system of claim 1, further comprising at least one object sensing device.

12. An interceptor unmanned aerial system comprising:
a rigid, fixed effector frame forming an outer perimeter of the interceptor unmanned aerial system, wherein the effector frame is rectangular in shape, said effector frame having a first end frame arm, second end frame arm, first side frame arm, and second side frame arm, said effector frame having four corners;
an effector attached directly to the frame such that the effector spans between at least two sides of the frame, wherein the effector is releasable from the effector frame;
at least two propulsion elements rotatable relative to the effector frame and connected to the effector frame and positioned at or proximate to said outer perimeter; and
at least one replacement effector positioned in a replacement effector storage compartment connected to the effector frame, wherein said replacement effector is configured to deploy upon release of the effector.

\* \* \* \* \*